United States Patent
Suhr et al.

[11] Patent Number: 5,293,841
[45] Date of Patent: Mar. 15, 1994

[54] ARRANGEMENT FOR UTILIZING THE HEAT CONTAINED IN THE EXHAUST GAS OF A COAL-FIRED BOILER

[75] Inventors: Ludwig Suhr, Essen; Paul Paikert, Witten, both of Fed. Rep. of Germany

[73] Assignee: GEA Luftkuhler GmbH, Bochum, Fed. Rep. of Germany

[21] Appl. No.: 27,180

[22] Filed: Mar. 5, 1993

[30] Foreign Application Priority Data

Mar. 6, 1992 [DE] Fed. Rep. of Germany ....... 4207082
Apr. 13, 1992 [DE] Fed. Rep. of Germany ....... 4212336

[51] Int. Cl.⁵ ............................................. F22B 33/00
[52] U.S. Cl. .............................. 122/1 A; 122/DIG. 1; 122/DIG. 2; 122/420
[58] Field of Search ............... 122/1 A, 1 B, 20 A, 122/20 B, DIG. 1, DIG. 2, 439, 420, 421; 431/215; 165/4; 932/180

[56] References Cited

U.S. PATENT DOCUMENTS

| | | |
|---|---|---|
| 2,803,439 | 8/1957 | Fikenscher ................. 122/1 A X |
| 4,206,722 | 6/1980 | Molley, Jr. .................. 122/1 A |
| 4,592,293 | 6/1986 | Toyama et al. ............. 122/1 A X |

FOREIGN PATENT DOCUMENTS

2935762 4/1981 Fed. Rep. of Germany ..... 122/1 A

*Primary Examiner*—Edward G. Favors
*Attorney, Agent, or Firm*—Feiereisen & Kueffner

[57] ABSTRACT

An arrangement for utilizing the heat contained in the exhaust gas from a coal-fired boiler for preheating feed water for the boiler and for preheating primary air. The arrangement includes a rotating heat transfer unit and lines for conducting exhaust gas and preheated combustion air to the heat transfer unit. A heat shifting unit is connected in parallel to the heat transfer unit. A line conducts primary air to the heat shifting unit and another line conducts cooled exhaust gas from the heat transfer unit to the heat shifting unit. The exhaust gas line and the cooled exhaust gas line connecting the heat transfer unit and the heat shifting unit are connected through a bypass which bridges the heat transfer unit. The bypass includes a heat exchanger and/or steam generator, wherein the boiler feed water flows through the heat exchanger and/or steam generator.

2 Claims, 3 Drawing Sheets

ARRANGEMENT FOR UTILIZING THE HEAT CONTAINED IN THE EXHAUST GAS OF A COAL-FIRED BOILER

BACKGROUND OF THE INVENTION

1. Field of the Invention

The present invention relates to an arrangement for utilizing the heat contained in the exhaust gas or combustion gas of a coal-fired boiler which forms a component of a power plant, for preheating feed water for the boiler and for preheating primary air. The arrangement includes a rotating heat transfer unit to which are admitted, on the one hand, the exhaust gas leaving the boiler and, on the other hand, the preheated combustion air, and a heat shifting unit connected in parallel to the heat transfer unit, wherein primary air, on the one hand, and cooled exhaust gas discharged from the heat transfer unit, on the other hand, can be admitted to the heat shifting unit.

2. Description of the Related Art

An arrangement of the above-described type is known from the brochure of GEA Lufitkühler GmbH, Dorstener Str. 18-29, 4690 Herne 2, Federal Republic of Germany, "Kraftwerk: Rauchgaswärme für die Vorheizung von Luft und Kondensat" [Power Plant: Flue Gas Heat for Preheating Air and Condensate]. In this arrangement, the heat carrier medium of the heat transfer unit, which flows in closed circulation, is conducted through a heat exchanger to which primary air, whose temperature corresponds to that of the ambient air, and through a heat exchanger to which is admitted another heat carrier medium which also flows in closed circulation and which is heated by the exhaust gas discharged by the heat transfer unit. This additional heat carrier medium also flows through a heat exchanger, to the other side of which is admitted the boiler feed water.

Although the exhaust gas emerging from the boiler which is fired with brown coal has a temperature of approximately 290° C., the exhaust gas available at the heat shifting unit has a temperature of only approximately 180° C., because of the heat exchange taking place in the rotating heat transfer unit. Accordingly, in view of the heat losses in the heat shifting unit, on the one hand, and in the circulation of the heat transfer medium between the heat shifting unit and the boiler feed water, on the other hand, the boiler feed water can only be heated to a maximum temperature of approximately 160° C. This means that a substantial amount of fuel must be fired in the boiler in order to further heat the boiler feed water which had been heated to approximately 160° C., to vaporize the water and, subsequently, to feed the steam to a turbine for producing electrical energy.

SUMMARY OF THE INVENTION

It is the primary object of the present invention to significantly increase the efficiency of an arrangement of the type described above.

In accordance with the present invention, the exhaust gas line leading to the heat transfer unit and the exhaust gas line between the heat transfer unit and the heat shifting unit are connected through a bypass which bridges the heat transfer unit, and the bypass includes a heat exchanger and/or a steam generator through which the boiler feed water flows.

The present invention is based, inter alia, on the recognition that, for technical reasons particular to boilers which are fired with brown coal, only about 75% of the combustion air required for the combustion of the brown coal will be supplied through the heat transfer unit. The remaining 25% of the combustion air will reach the boiler through different paths, for the most part as a result of leakages, whereas in the past, the entire mass flow of the exhaust gas leaving the boiler was conducted through the heat transfer unit.

The present invention is not limited to plants utilizing brown coal. Other fuels for firing the boilers are also conceivable.

In accordance with the present invention, the entire exhaust gas flow is no longer conducted through the heat transfer unit, but only that quantity of exhaust gas is conducted which is required to heat the combustion air in the heat shifting unit from approximately 110° C. to approximately 270° C., when the temperature of the exhaust gas has been lowered from approximately 290° C. to 180° C. This represents approximately two-thirds of the entire quantity of exhaust gas. The remaining quantity of the exhaust gas, i.e., approximately one-third of the entire exhaust gas flow in this practical application, is now conducted to the bypass around the heat transfer unit, and through a heat exchanger integrated in the bypass and/or through a steam generator provided in the bypass, and is cooled in the heat exchanger or steam generator to approximately 180° C.

In the process, the boiler feed water flowing into the heat exchanger is heated from approximately 160° C. to approximately 260° C. Consequently, it is now possible to make available to the boiler a boiler feed water which is heated to a very high temperature.

If a steam generator is included in the bypass instead of the heat exchanger, or parallel to the heat exchanger, the heat contained in the exhaust gas can be utilized for obtaining steam and, thus, for generating electrical current.

Accordingly, the invention makes possible an optimum utilization of the heat which is additionally coupled out by means of the bypass and the heat exchanger integrated into the bypass. The heat transferred to the boiler feed water in this manner can be converted to electrical current with a higher degree of efficiency than was possible at the conventional boiler feed water temperatures.

If the exhaust heat is utilized for steam production and an additional steam turbine produces electrical current by means of this steam. the production of electrical current can be significantly increased, as compared to the electrical current generated in the principal turbine.

In this manner, the quantity of heat, or the corresponding quantity of fuel required for the temperature increase or the steam production, is directly saved. Accordingly, the efficiency of the power plant can be significantly increased.

In accordance with another advantageous embodiment of the invention, the exhaust gas leaving the heat shifting unit is conducted through a flue gas desulfurization unit to a smokestack. In this embodiment, the present invention provides that the heat shifting unit is connected to a heat exchanger which is incorporated into an exhaust gas line between the smoke gas desulfurization unit and the smokestack.

The various features of novelty which characterize the invention are pointed out with particularity in the claims annexed to and forming a part of the disclosure.

For a better understanding of the invention, its operating advantages, and specific objects attained by its use, reference should be had to the drawing and descriptive matter in which there are illustrated and described preferred embodiments of the invention.

DESCRIPTION OF THE PREFERRED EMBODIMENTS

Figure 1:
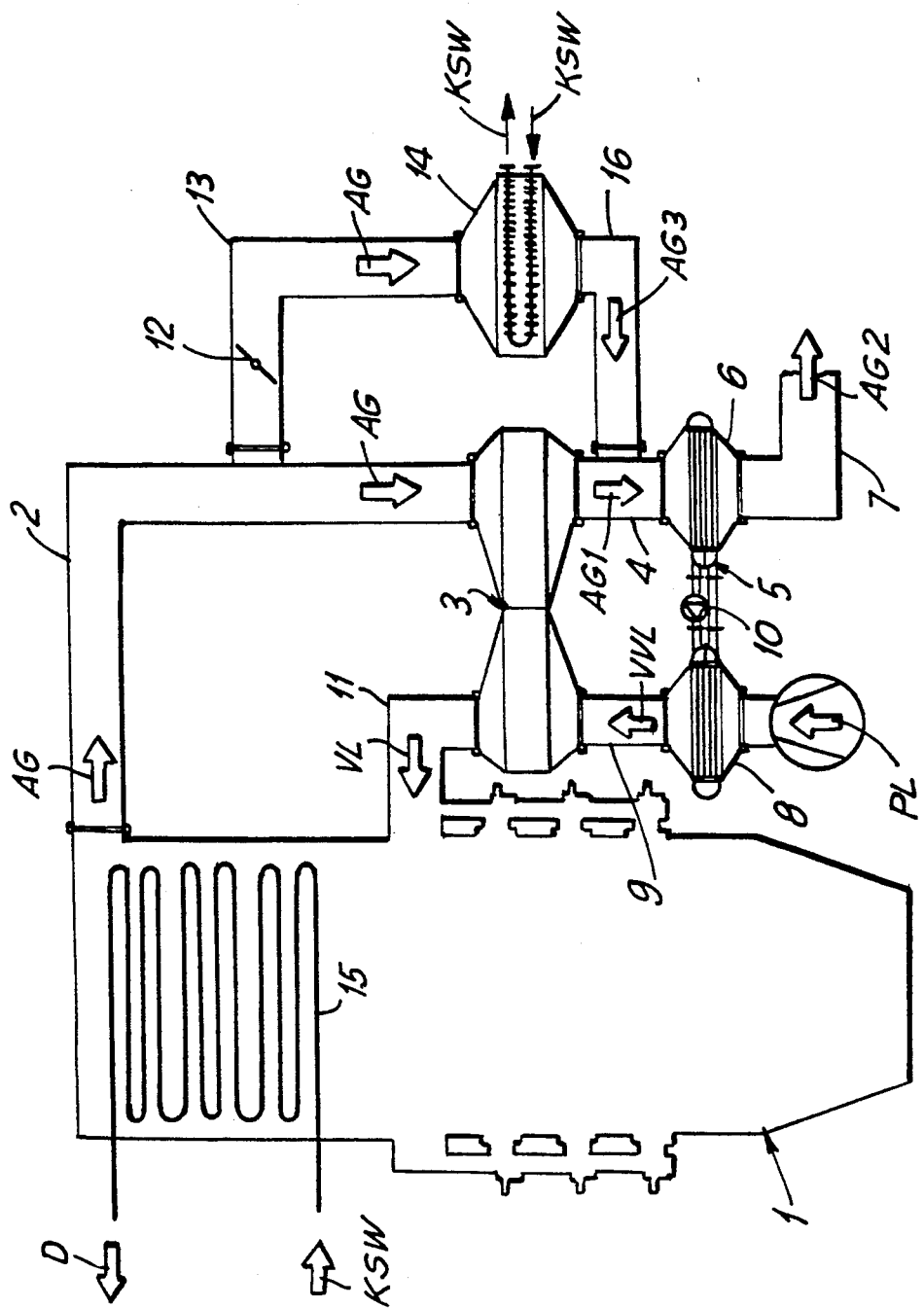
FIG. 1 is a schematic view of an arrangement according to the present invention for utilizing the heat contained in the exhaust gas of a coal-fired boiler for preheating the boiler feed water and for heating primary air.
Figure 2:
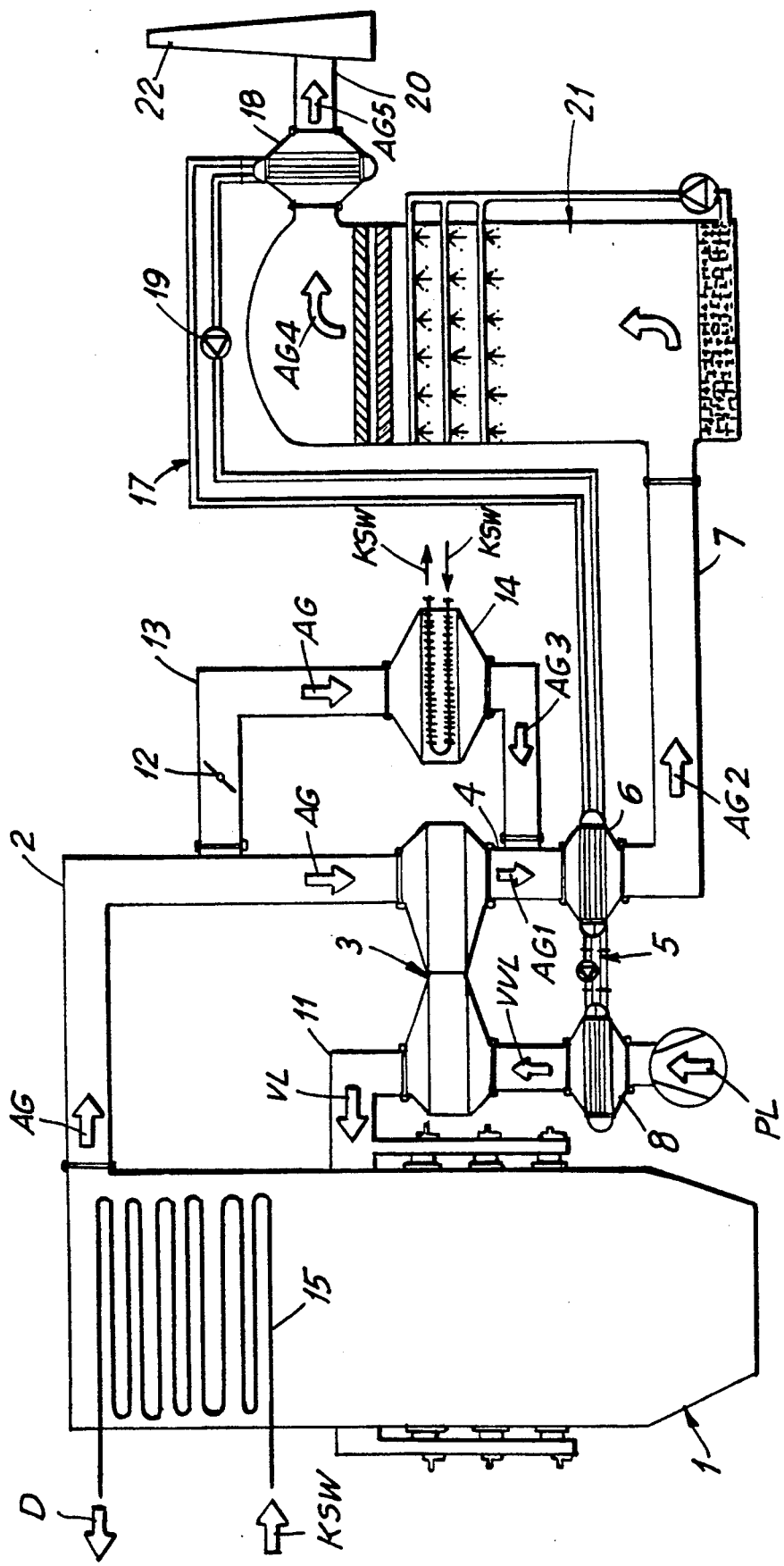
FIG. 2 is a schematic view of another embodiment of the arrangement according to the present invention.

In FIGS. 1 and 2 of the drawing, reference numeral 1 denotes a boiler which is fired with brown coal and is a component of a power plant for producing electrical energy, not illustrated in detail.

The exhaust gas AG produced by the firing of brown coal is conducted through line 2 to rotating heat transfer unit 3. The heat transfer unit 3 is a so-called Ljungström heat exchanger, also called a LUVO. The exhaust gas AG emerging from the boiler 1 has a temperature of approximately 290° C.

Heat is removed from the exhaust gas AG in the LUVO 3, so that the exhaust gas AG1 leaving the LUVO 3 through the line 4 has a temperature of approximately 180° C.

Subsequently, the exhaust gas AG1 is conducted through a heat exchanger 6, which forms a component of a heat shifting unit 5 and in which the exhaust gas AG1 gives off additional heat, so that the exhaust gas AG2 leaving the heat exchanger 6 through the line 7 has a temperature of approximately 110° C. At this temperature the exhaust gas AG2 can be supplied, for example, to a flue gas desulfurization unit.

The heat removed from the exhaust gas AG1 in the heat exchanger 6 of the heat shifting unit 5 is supplied to a heat exchanger 8 by means of a heat carrier medium which flows in the heat shifting unit 5 in closed circulation. The heat exchanger 8 is incorporated in a line 9 to which primary air PL is supplied at a temperature of approximately 20° C., which corresponds to ambient air. Circulation of the heat carrier medium is maintained in the heat shifting unit 5 by means of a pump 10.

The heat removed from the exhaust gas AG1 is used for heating the primary air PL to a temperature of approximately 110° C. This preheated combustion air VVL is subsequently conducted through the LUVO 3. As a result, the LUVO 3 is protected against corrosion. The temperature of the preheated combustion air VVL is further increased in the LUVO 3 by means of the heat removed from the exhaust gas AG in the LUVO 3.

Subsequently, combustion air VL having a temperature of approximately 270° C. is supplied to the boiler 1 through a line 11.

The exhaust gas line 2 leading to the LUVO 3 and the exhaust gas line 4 between the LUVO 3 and the heat shifting unit 5 are connected through a bypass 13 which can be controlled by means of a flap 12. A heat exchanger 14 is integrated in the bypass 13. Boiler feed water KSW flows through the heat exchanger 14.

Of the quantity of exhaust gas emerging from the boiler 1, approximately two-thirds is conducted through the LUVO 3 and the remaining approximately one-third is conducted through the bypass 13. The heat transferred from the exhaust gas AG to the heat exchanger 14 in the bypass 13 is absorbed by the boiler feed water KSW, and its temperature is raised from approximately 160° C.

Subsequently, the temperature of the boiler feed water KSW leaving the heat exchanger 14 is further increased in a conventional manner, not illustrated in detail, and is finally conducted into a coil pipe system 15 in the boiler 1. In the system 15, the boiler feed water KSW is vaporized. The resulting steam D is then conducted to a turbine, not illustrated, for the production of electrical energy.

The exhaust gas AG3 leaving the heat exchanger 14 through the bypass 13 has a temperature of approximately 180° C. The exhaust gas AG3 is conducted through a line section 16 of the bypass 13 into the line 4 between the LUVO 3 and the heat shifting unit 5 and is mixed at this location with the exhaust gas AG1 leaving the LUVO 3.

The embodiment illustrated in FIG. 2 of the drawing is identical to the embodiment of FIG. 1 with respect to the components boiler 1, LUVO 3, bypass 13 with heat exchanger 14, and heat shifting unit 5. Accordingly, the above description of FIG. 1 is also applicable to FIG. 2.

FIG. 2 further shows that the heat shifting unit 5 is connected through a closed circulation system 17 to a heat exchanger 18. A heat carrier medium which is moved by means of a pump 19 flows through the circulation system 17.

The heat exchanger 18 is provided in a line 20 between a flue gas desulfurization unit 21, not described in detail, and a schematically shown smokestack 22.

The exhaust gas AG2 leaving the heat shifting unit 5 through the line 7 at a temperature of approximately 110° C. is supplied to the flue gas desulfurization unit 21, in which it is cleaned and cooled to a temperature of approximately 50° C. The exhaust gas AG4 leaving the flue gas desulfurization unit 21 is subsequently again heated in the heat exchanger 18 to a temperature of approximately 85° C., at which temperature the exhaust gas AG5 is then transferred to the smokestack 22 in a condition which meets the prescribed emission requirements.

Figure 3A:
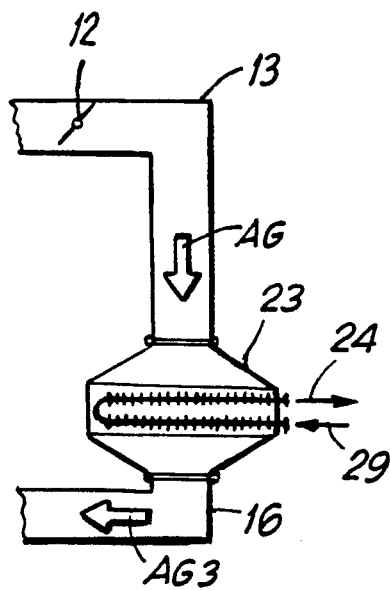
FIGS. 3a and 3b show an arrangement for producing steam from the exhaust gas heat.
Figure 3B:
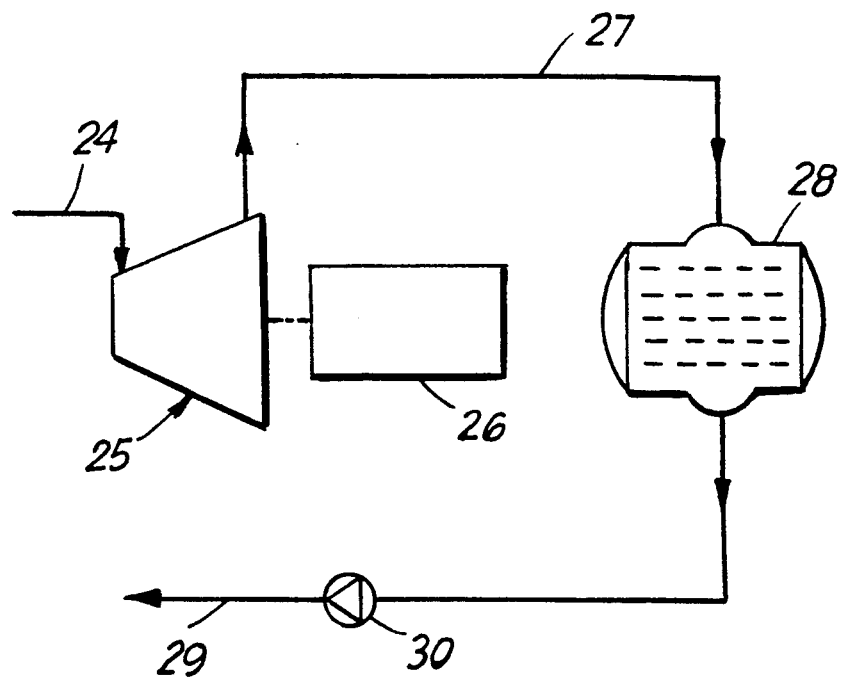

In the arrangement illustrated in FIG. 3a, the heat contained in the exhaust gas AG is utilized in a steam generator 23 which is incorporated into the bypass 13, rather than in heat exchanger 14 as shown in FIG. 1. A steam line 24 connects the steam generator 23 to a steam turbine 25 illustrated in FIG. 3b. The steam turbine 25 is used for producing electrical current. For this purpose, the steam turbine 25 is coupled to a generator 26.

Steam whose tension has been lowered is conducted from the steam turbine 25 through the line 27 into a water-cooled and/or air-cooled condenser 28. The steam whose tension has been reduced is condensed in the condenser 28 and is conducted through the line 29 into the steam generator 23.

A pressure increasing pump 30 is incorporated in the line 29 between the condenser 28 and the steam generator 23.

It should be understood that the preferred embodiments and examples described are for illustrative purposes only and are not to be construed as limiting the scope of the present invention which is properly delineated only in the appended claims.

I claim:

1. An arrangement in a power plant for utilizing heat contained in exhaust gas from a coal-fired boiler for preheating feed water for the boiler and for preheating primary air, the arrangement comprising a rotating heat transfer unit and a heat shifting unit arranged in series to the heat transfer unit, an exhaust gas line for conducting the exhaust gas from the boiler to the heat transfer unit, a preheated combustion air line for conducting preheated combustion air from the heat shifting unit to the heat transfer unit, a cooled exhaust gas line for conducting cooled exhaust gas from the heat transfer unit to the heat shifting unit, and a primary air line for conducting primary air to the heat shifting unit, further comprising a bypass for bridging the heat transfer unit, the bypass being connected to the exhaust gas line and the cooled exhaust gas line, the bypass comprising at least one of a heat exchanger and a steam generator, and means for conducting the feed water through the at least one of the heat exchanger and the steam generator.

2. The arrangement according to claim 1, further comprising a desulfurization unit, another exhaust gas line connecting the heat shifting unit to the desulfurization unit and a further exhaust gas line for connecting the desulfurization unit to a smokestack, the further exhaust gas line between the desulfurization unit and the smokestack comprising another heat exchanger, and means for connecting the another heat exchanger to the heat shifting unit.

* * * * *